US006760678B1

(12) United States Patent
Hon et al.

(10) Patent No.: US 6,760,678 B1
(45) Date of Patent: Jul. 6, 2004

(54) ELECTRONIC COMPASS

(75) Inventors: Patrick Fong Wing Hon, Hong Kong (HK); Johnny Tam Ping Wah, Hong Kong (HK)

(73) Assignee: Electronics Tomorrow Limited, Hunghom (HK)

( * ) Notice: Subject to any disclaimer, the term of this patent is extended or adjusted under 35 U.S.C. 154(b) by 0 days.

(21) Appl. No.: 09/546,516

(22) Filed: Apr. 11, 2000

(51) Int. Cl.[7] ............................................. G06F 19/00
(52) U.S. Cl. ............................ 702/92; 33/356; 33/361
(58) Field of Search ......................... 702/92; 73/1.76; 33/356, 361

(56) References Cited

U.S. PATENT DOCUMENTS

| | | | |
|---|---|---|---|
| D244,434 S | * 5/1977 | Moore | D10/46 |
| 4,445,279 A | 5/1984 | Tsushima et al. | |
| 4,533,872 A | 8/1985 | Boord et al. | |
| 4,622,843 A | * 11/1986 | Hormel | 73/1.76 |
| 4,677,754 A | 7/1987 | Hormel | |
| 4,694,583 A | * 9/1987 | Blaney | 33/348 |
| 4,720,992 A | * 1/1988 | Hormel | 33/356 |
| 4,733,179 A | 3/1988 | Bauer et al. | |
| 4,750,349 A | 6/1988 | Luitje | |
| 4,807,462 A | * 2/1989 | Al-Attar | 33/356 |
| 4,851,775 A | 7/1989 | Kim et al. | |
| 4,953,305 A | 9/1990 | Van Lente et al. | |
| 5,161,311 A | * 11/1992 | Esmer et al. | 324/245 |
| 5,165,269 A | 11/1992 | Nguyen | |
| 5,239,264 A | 8/1993 | Hawks | |
| D345,310 S | 3/1994 | Henning | |
| 5,381,603 A | 1/1995 | Lee | |
| 5,684,397 A | 11/1997 | Ishishita | |
| 5,737,226 A | 4/1998 | Olson et al. | |
| 6,084,406 A | 7/2000 | James et al. | |

* cited by examiner

Primary Examiner—John Barlow
Assistant Examiner—Stephen J. Cherry
(74) Attorney, Agent, or Firm—Cook, Alex, McFarron, Manzo, Cummings & Mehler, Ltd.

(57) ABSTRACT

A method and system for continuously and automatically calibrating the settings of an electronic compass, as needed, while a vehicle moves from place to place is shown. The calibration technique of the present invention measures the ocal magnetic field while the vehicle moves from place to place and determines points on a reference Cartesian coordinate system. Each such point defines the endpoint for a vector corresponding with the measured field intensity and orientation of the local magnetic field. Any three such points are used to calculate the center of a circle that extends through all of those points. A vector that begins at the origin of the reference Cartesian coordinate system and terminates at the calculated center of the circle is thereafter subtracted from subsequent field measurement vectors that correspond to the field intensity and direction of the local magnetic field. As a result, the electronic compass compensates for interfering magnetic fields, including those resulting from the varying magnetic field signatures of its associated vehicle.

20 Claims, 7 Drawing Sheets

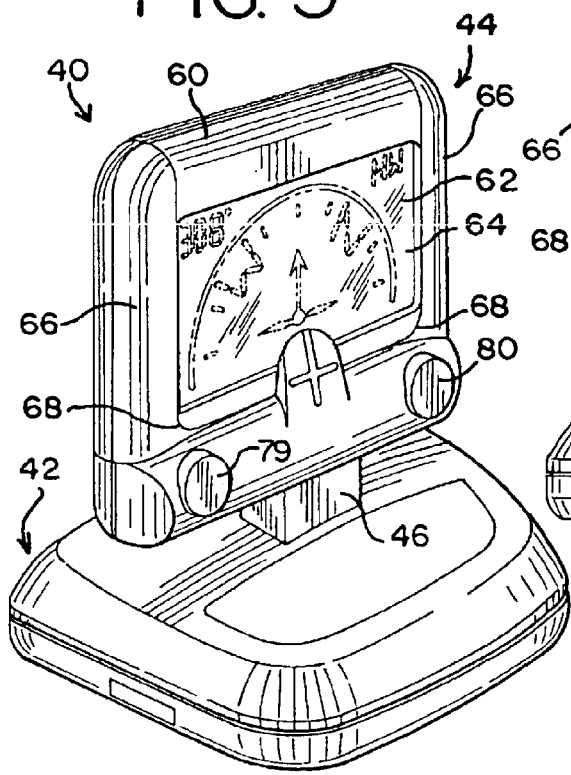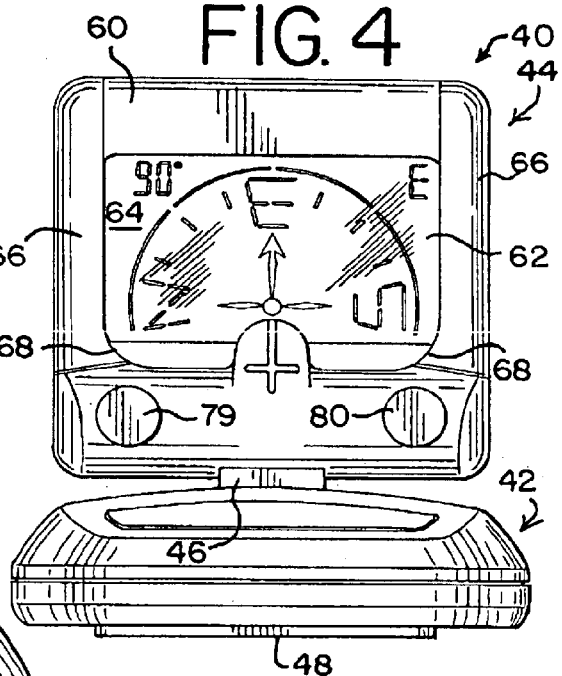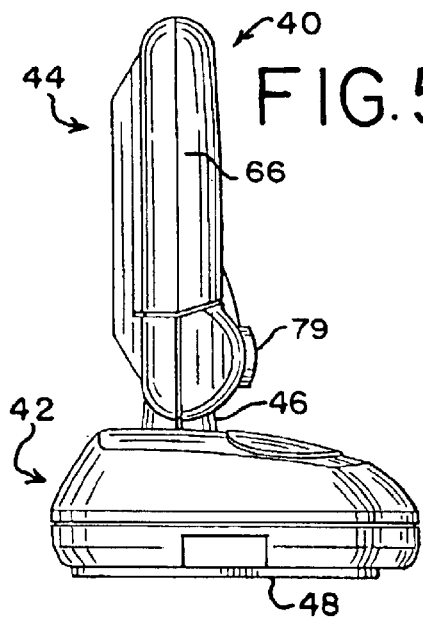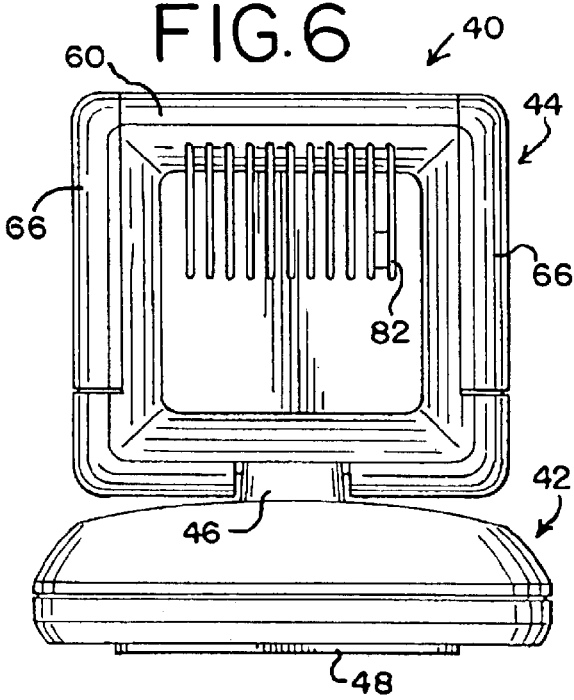

ELECTRONIC COMPASS

FIELD OF THE INVENTION

The present invention relates generally to an electronic compass and, more particularly, to a system for and a method of calibrating the compass and displaying a designation of direction heading on the display of the compass.

BACKGROUND OF THE INVENTION

Although its cause is still the subject of dispute, it is well understood among scientists that planet Earth has its own natural magnetic field. As was discovered early in world history, the Earth's magnetic field can be used to indicate directional heading. A device that senses the Earth's magnetic field and aligns a ferromagnetic pointer with the flux lines of the Earth's magnetic field is generally referred to as a compass. This alignment allows for an identification of directional heading. Compasses are classified within a family of instruments referred to as magnetometers, which function to detect and measure the magnitude and/or direction of magnetic fields.

Modern mechanical compasses typically include a needle mounted for rotational movement that aligns itself with the magnetic flux lines of Earth's magnetic field. As is well understood, by convention, the magnetic flux lines are said to terminate at the Earth's magnetic north pole. Typically, during operation, a compass needle points towards the Earth's magnetic north pole, which is located in Canada.

The ability to identify direction, which is provided for by a compass, has proven to be invaluable for navigators and other travelers. Accordingly, since the development of the very first compasses, navigators have used such devices to sense and identify the directional heading traversed by their vehicles. Today, besides being a favorite among campers, compasses are found on board a variety of vehicles, including airplanes, ships, boats and automobiles. Compasses are increasingly used in position and navigation systems for vehicles.

One drawback of modern mechanical compasses is their inability to be calibrated to eliminate errors due to the magnetic field signature of nearby ferromagnetic material having relatively high permeability. It is understood by those skilled in the art that vehicles ordinarily have their own unique and distinct magnetic field signatures. In other words, the material from which a vehicle is made produces magnetic interference, which combines with the Earth's magnetic field. As will be appreciated, a compass installed in the vehicle will read the combined magnetic field (i.e., the Earth's magnetic field and the magnetic field corresponding to the vehicle's magnetic signature), and will in all likelihood generate inaccurate results as to the vehicle heading. In some cases, the effect of the vehicle magnetic field on the compass reading substantially overrides the effect of the Earth's magnetic field on the compass reading. When that occurs, the compass is rendered useless as a directional heading identification instrument.

With the advent of electronic technology in modem consumer products, electronic compasses have been developed. Electronic compasses provide substantial benefits over mechanical compasses for several reasons. One such reason is that electronic compasses can be more readily calibrated so that they eliminate the aforementioned vehicle signature magnetic field effect.

Electronic compasses produce electrical signals indicative of directional heading, based upon a measurement of the magnetic field intensity of the Earth's magnetic field relative to the orientation of the compass. Conventionally, electronic compasses include two distinct data channels defined by two orthogonally disposed magnetic field sensors aligned in the same plane. As a practical matter, the sensors are mounted on the same printed circuit board (PCB) positioned inside the housing of the electronic compass. As is well known in the art, the sensors generate electrical signals representative of the sensed magnetic field intensity of the Earth's magnetic field.

For purposes of representation and to facilitate an understanding of those signals, the respective magnitudes of the output electrical signals for each sensor may be represented by the magnitudes of component vectors on respective axes of a reference Cartesian coordinate system. In particular, the magnitude of the electrical signal for a first magnetic sensor may be represented by the magnitude of a first component vector extending in the same direction as the abscissa axis of a reference Cartesian coordinate system. On the other hand, the magnitude of the electrical signal for the second magnetic sensor may be represented by the magnitude of a second component vector extending in the same direction as the ordinate axis of that reference Cartesian coordinate system.

When the vector sum of the two aforementioned component vectors is determined, a resultant vector is produced, which ideally corresponds with the Earth's magnetic field vector, both in magnitude and direction. As will be appreciated, the electronic compass performs this vector summing operation to determine the directional heading.

In the ideal case (i.e., in the absence of any interfering magnetic fields), as the compass is rotated full circle (360 degrees) while being subjected to the Earth's magnetic field, the Earth's magnetic field vector will trace a circle having its center positioned at the origin of the reference Cartesian coordinate system. In that regard, the magnetic field intensity of the Earth's magnetic field, which corresponds with the magnitude of the Earth's magnetic field vector, is uniform. Therefore, as the compass is rotated full circle, the magnitude of the Earth's magnetic field vector is constant. On the other hand, although the Earth's magnetic field flux lines maintain constant direction, the orientation of those flux lines relative to the orientation of the magnetic sensors in the electronic compass varies while the compass is rotated. This relative difference is represented by the direction (i.e., angle) of the Earth's magnetic field vector. Therefore, as the compass is rotated fill circle, the direction of the Earth's magnetic field vector varies, and more particularly, rotates full circle as well. FIG. 1 illustrates a reference Cartesian coordinate system 20 that is used to represent the ideal electrical signals for each of the two data channels of an electronic compass. Those electrical signals are produced by the two orthogonally disposed magnetic sensors of the compass. The reference Cartesian coordinate system 20 includes a point of origin 22. Extending from origin 22 in opposite directions are the two opposing sides 24, 26 of an abscissa 28 (e.g., x-axis). Likewise, the two opposing sides 30, 32 of an ordinate 34 (e.g., y-axis) extend in opposite directions from origin 22. As shown, the opposing sides 24, 26 of abscissa axis 28 are orthogonally positioned with respect to the opposing sides 30, 32 of ordinate axis 34.

Still referring to FIG. 1, the electrical signal outputs for the orthogonally disposed magnetic sensors are represented by component vectors Vx and Vy, respectively. As shown, component vector Vx is a vector having a magnitude Vx, which corresponds to the magnetic field intensity sensed by one of the orthogonally disposed magnetic sensors. Component vector Vx extends in a direction from origin 22 to a point along one of the sides 24, 26 of abscissa 28. As further shown, component vector Vy is a vector having a magnitude Vy, which corresponds to the magnetic field intensity sensed by the other of the orthogonally disposed magnetic sensors. Component vector Vy extends in a direction from origin 22 to a point along one of the sides 30, 32 of ordinate 34. Component vectors Vx and Vy represent the magnetic field intensities measured by the two orthogonally disposed magnetic sensors, respectively. The two vector components Vx and Vy are added together to form a resultant vector Vm, which defines the total compass output. Resultant vector Vm has a magnitude Vm, which corresponds to the resultant (or total) magnetic field intensity sensed by both channels of the electronic compass. Unlike its vector components (vectors Vx and Vy), resultant vector Vm does not necessarily extend along abscissa 28 or ordinate 34. Rather, resultant vector Vm extends in a direction such that an angle α is formed between it and the positive extending side 24 of abscissa 28. The angle α corresponds to the directional heading of the compass with respect to the positioning of its two orthogonally disposed magnetic sensors.

FIG. 1 assumes the ideal case in which there is no nearby interfering magnetic field to cause an inaccurate measurement of the compass heading. Both magnetic sensors included within the compass generate a sinusoidal output when rotated in the Earth's magnetic field. For this ideal case, if the compass is rotated full circle, the resultant vector Vm plots a circle having a radius Vm and centered at the origin 22 of reference Cartesian coordinate system 20. The ideal case illustrated in FIG. 1 does not commonly occur, however. In particular, disturbing nearby magnetic fields frequently exist. Those disturbing fields distort the outputs of the magnetic sensors. One major cause of error is the magnetic field signature of vehicles. Most vehicles have their own distinct magnetic field signatures. Such magnetic field signatures have an effect on the operation of the electronic compass and cause it to display inaccurate results of directional heading. FIG. 2 represents a real case in which the output of the electronic compass is subjected to the magnetic field signature of a vehicle. As is the case with FIG. 1, FIG. 2 illustrates reference Cartesian coordinate system 20 having origin 22. As the electronic compass is rotated full circle, the distorted magnetic field produces a circular locus of points centered at a point O_Noise(x,y), rather than origin 22. Point O_Noise(x,y) is offset from the origin 22 of Cartesian coordinate system 20 by an offset vector Vo. To facilitate understanding, a translated Cartesian coordinate can be defined as having its origin at point O_Noise(x,y) and its abscissa and ordinate extending parallel to the abscissa and ordinate of Cartesian coordinate system.

As a result of the disturbing magnetic field signature of the vehicle, the compass output vector Vm falsely suggests that the direction of the compass heading is the direction corresponding with the angle β, when it is actually the direction corresponding with the angle α. The actual magnetic field vector Va is obtained by subtracting the offset vector Vo from the compass output vector Vm. Vector Va extends in a direction α, which corresponds with the actual direction of compass heading. The angle α can be determined by performing familiar trigonometric functions. For instance, α can be determined by taking the arctangent of the respective component vectors for vector Va.

As is appreciated by those skilled in the art, once the noise center (O_Noise(x,y)) is determined, it is relatively easy to calibrate an electronic compass. Several calibration techniques have been used in the past. The methods of calibration used in the past can generally be classified in two categories. The first such category is manual calibration techniques. The second category is automatic calibration techniques.

The manual calibration techniques generally require that the calibration be performed each and every time the magnetic field signature of the vehicle appreciably changes. As is well known by those skilled in the art, the vehicle load has a substantial effect on the magnetic field signature of the vehicle. As passengers and/or cargo enter and/or exit the vehicle, the magnetic field signature varies. Accordingly, the compass user must calibrate the compass often. As will be appreciated, this task is arduous and time consuming.

The majority of manual calibration techniques also require the user to conduct both a northerly calibration of the compass and a bidirectional calibration of the compass. On top of all of the foregoing, these manual techniques require that the outside environment be free from interfering magnetic fields. The conventional automatic calibration techniques typically adopt a search and match algorithm. In a first example, the calibrating system of the compass stores the magnetic field strength vectors and identifies the occurrence of the vehicle having completed a full turn of one hundred eighty (180) degrees. The calibrating system then determines the correct magnetic strength vector and calibrates the compass to compensate for the interfering magnetic field resulting from the magnetic signature of the vehicle. In a second example of conventional automatic calibration techniques, the calibrating system stores a variety of magnetic field strength vectors, and determines a pair of vertical points and a pair of horizontal points symmetrically positioned with respect to the noise center. In order to determine these points, the vehicle inherently must complete at least a turn of one hundred eighty (180) degrees. From these vertical and horizontal pairs of symmetrical points, the noise center can be obtained and the compass can be calibrated to compensate for the interfering magnetic field resulting from the magnetic signature of the vehicle.

The aforementioned conventional automatic calibration techniques require the outside environment to be free from interfering magnetic fields. Because they are not extremely efficient, these techniques often require the vehicle to be rotated in several circles, which is cumbersome and sometimes impractical to implement. U.S. Pat. No. 5,165,269 (Nguyen), issued Nov. 24, 1992, the disclosure of which is hereby incorporated herein by reference, discloses an electronic compass calibration technique in which the vehicle must be driven in a deliberate circular path. While the vehicle is driven as such, four specific reference points, namely a pair of symmetrical vertical points and a pair of symmetrical horizontal points, are determined. Those reference points represent the orthogonal outputs of the compass as they cross the x-axis and y-axis of a reference Cartesian coordinate system. Those outputs permit the computation of a calibrated compass heading. After the initial calibration, the compass may be calibrated again while the vehicle is moving, but the vehicle must move through a closed loop before each such subsequent calibration.

Similar to the other conventional automatic calibration techniques, the electronic compass calibration technique disclosed in U.S. Pat. No. 5,165,269 requires the user to drive the vehicle in a circular path during the initial calibration process and requires that a pair of vertical points and a pair of horizontal points be determined in order to perform the calibration. Furthermore, the calibration technique disclosed therein does not allow for subsequent calibrations to be made on a continuous basis. Rather, the technique only permits such subsequent calibrations when the vehicle has moved in a closed loop.

U.S. Pat. No. 5,161,811 (Esmer et al.), issued Nov. 10, 1992, the disclosure of which is hereby incorporated herein by reference, discloses an electronic compass calibration technique that, according to its disclosure, does not require user intervention or the need to drive the vehicle in a circular path at the outset. In order to conduct the calibration technique, however, the maximum and minimum voltage values for the two orthogonally disposed sensing windings must be determined. Although the calibration technique disclosed in U.S. Pat. No. 5,161,811 apparently does not require that the vehicle be driven in a deliberate circular path, as a practical matter, the compass cannot be calibrated in accordance with that technique unless the vehicle is driven in a select angular path that is at least semi-circular. In that regard, it will be appreciated by those skilled in the art that the maximum and minimum voltage values for the sensing windings cannot be determined unless the vehicle is driven in at least a semi-circular path. Furthermore, for each subsequent calibration of the compass, the vehicle must be driven in the select angular path to determine the maximum and minimum voltage values for the sensing windings. Accordingly, the calibration technique disclosed in U.S. Pat. No. 5,161,311 does not, as stated therein, permit for continuous adjustment of the compass calibration settings. Rather, the vehicle must be driven in the select angular path each and every time the compass calibration process is performed.

In light of the foregoing, there exists a substantial need in the art for an electronic compass calibration technique that does not require the user to drive the vehicle in a predetermined path in order to conduct the initial calibration of the compass and any necessary subsequent calibrations. Furthermore, there exists a substantial need in the art for an electronic compass calibration technique that can be performed at any time while the vehicle is moving and is not dependent upon driving the vehicle in an angular path of any substantial significance. In other words, there exists a substantial need in the art for an electronic compass calibration technique that is truly automatic.

FIELD OF THE INVENTION

The present invention is directed to a method and system for continuously and automatically calibrating the settings of an electronic compass, as needed, while a vehicle moves from place to place. The calibration technique of the present invention measures the local magnetic field while the vehicle moves from place to place and determines points on a reference Cartesian coordinate system. Each such point defines the endpoint for a vector corresponding with the measured field intensity and orientation of the local magnetic field. Only any three such points are required. They are used to calculate the center of a circle that extends through all of those points. A vector that begins at the origin of the reference Cartesian coordinate system and terminates at the calculated center of the circle is thereafter subtracted from subsequent field measurement vectors that correspond to the field intensity and direction of the local magnetic field. As a result, the electronic compass compensates for interfering magnetic fields resulting from the varying magnetic field signatures of its associated vehicle.

Accordingly, it is an object of the present invention to provide a new and improved method and system for calibrating the output of an electronic compass.

It is another object of the present invention to provide an electronic compass calibration technique that is truly automatic. It is further object of the present invention to provide an electronic compass calibration technique that does not require the user to drive the vehicle in a predetermined path in order to conduct the initial calibration of the compass. It is still another object of the present invention to provide an electronic compass calibration technique that does not require the user to drive the vehicle in a predetermined path in order to conduct calibrations subsequent to the initial calibration of the compass.

It is yet another object of the present invention to provide an electronic compass calibration technique that can be performed at any time while the vehicle is moving.

It is another object of the present invention to provide an electronic compass calibration technique that is not dependent upon driving the vehicle in an angular path of any substantial significance. It is a further object of the present invention to provide an electronic compass calibration technique that permits proper initial and subsequent calibration upon driving the vehicle in an angular path that is substantially less than one hundred eighty degrees. It is still yet another object of the present invention to provide an electronic compass calibration technique that requires only three measurements of magnetic field intensity and direction.

These and other objects of the preferred form of the invention will become apparent from the following description. It will be understood, however, that an apparatus could still appropriate the claimed invention without accomplishing each and every one of these objects, including those gleaned from the following description. The appended claims, not the objects, define the subject matter of the invention. Any and all objects are derived from the preferred form of the invention, not necessarily the invention in general.

BRIEF DESCRIPTION OF THE DRAWINGS

In describing the preferred embodiment of the present invention, reference is made to the accompanying drawings wherein like parts have like reference numerals, and wherein:

FIG. 3 is a front perspective view of an electronic compass constructed in accordance with the principles of the present invention.

FIG. 4 is a front elevational view of the electronic compass shown in FIG. 3.

FIG. 5 is a side elevational view of the electronic compass shown in FIGS. 3–4.

FIG. 6 is a rear elevational view of the electronic compass shown in FIGS. 3–5.

DETAILED DESCRIPTION OF THE PREFERRED EMBODIMENT

Figure 1:
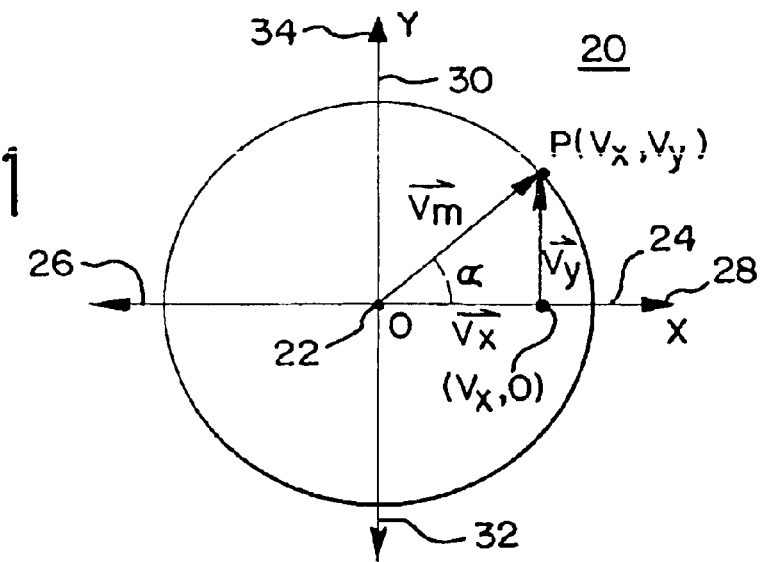
FIG. 1 is a diagrammatic view of a vector shown on a Cartesian coordinate system and corresponding to the ideal output of an electronic compass in the absence of magnetic interference.

FIGS. 3–7 illustrate an electronic compass generally designated 40 having a base portion 42 and a display portion 44. The base portion 42 includes an upwardly extending mount 46. Display portion 44 is pivotally connected to mount 46. Base portion 42 provides support for compass 40 while it is mounted to the dashboard, windshield or other surface of a vehicle. It is preferably mounted on a level surface and away from electrical equipment with a strong magnetic field. Base portion 42 preferably includes one of the mating sides of a hook and loop fastener 48 adhered to its bottom surface 50. The other mating side of the hook and loop fastener 48 is preferably adhered to the mounting surface of the vehicle and the compass is removably mounted thereon. Because display portion 44 is pivotally connected to base portion 42 (in the illustrated case through mount 46), display portion 44 can pivot back to permit side mounting of compass 40, thereby permitting it to be mounted to a windshield and allowing optimum visibility.

Base portion 42 preferably includes an energy cell compartment 52 (see FIG. 7) for providing electrical energy for the electronic circuitry associated with compass 40. Conductors extend from the energy cell compartment and through the upwardly extending mount 46 to establish electrical communication between the energy cells included in compartment 52 and the electronic circuitry associated with compass 40. As is conventional in the art, the energy cell compartment preferably includes a removable plate 54 having a latch 56 for securing it to the bottom surface 50 of base portion 42. When secured thereto, removable plate 54 serves as part of the bottom surface 50 of base portion 42. As such, the side of hook and loop fastener 48 that is adhered to the bottom surface 50 of base portion 42 is preferably adhered to the removable plate 54 of energy cell compartment 52.

Display portion 44 includes a circuit housing section 60 that houses the electronic circuitry associated with compass 40, including a liquid crystal display 62. Display portion 44 further includes a transparent face plate 64 through which any representation of directional heading indicated by liquid crystal display 62 can be viewed. Display portion 44 also includes a pair of end caps 66 positioned along opposite edges of the display portion. Face plate 64 is positioned over liquid crystal display 62 and protects it from the external environment. Each end cap 66 has a retaining edge 68 that secures face plate 64 in position against circuit housing section 60.

Figure 8:
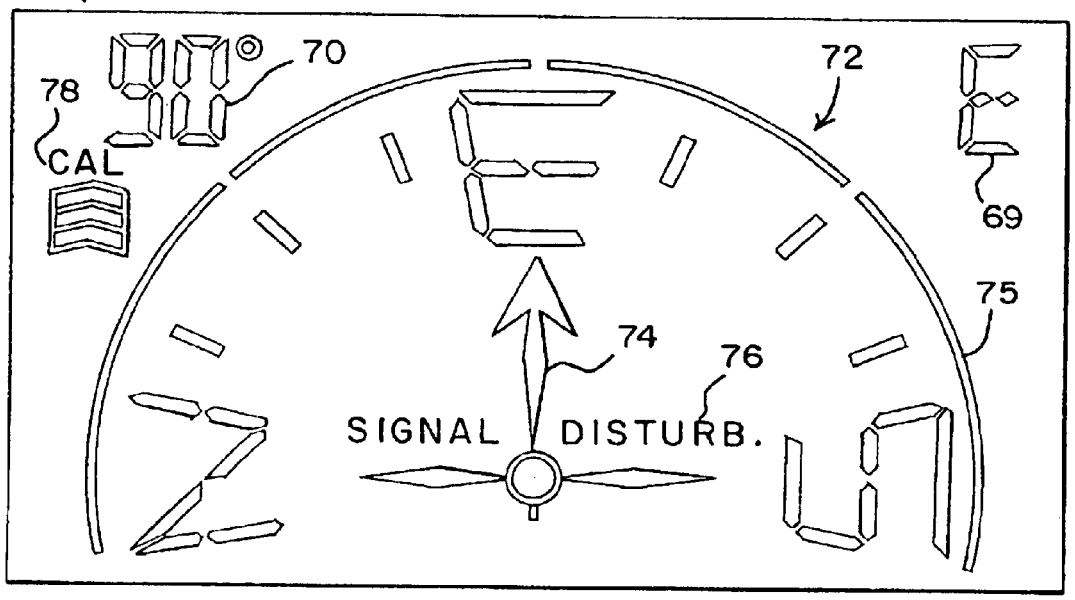
FIG. 8 is a diagrammatic view of the display for the electronic compass shown in FIGS. 3–7.

Referring specifically to liquid crystal display 62, as shown in FIG. 8, the LCD 62 has an eight point readout that includes a cardinal point indicator 69, a directional degree indicator 70, a mobile directional compass indicator 72 having a fixed arrow 74 and a shifting indicator band 75, a signal disturb indicator 76, and a calibration indicator 78. The cardinal point indicator 69 indicates the general directional heading in terms of those conventional in the art (e.g., N, NW, W, etc.). The directional degree indicator 70 indicates the conventional degrees in terms of numeric digits conventionally associated with directional headings. Preferably, the directional degree indicator 70 indicates heading in single degree increments. Mobile directional compass indicator 72 includes a fixed arrow 74 that stays stationary. The shifting indicator band 75 changes position relative to fixed arrow 74 as the compass heading changes. Shifting indicator band 75 preferably moves in twenty two and a half degree increments. Accordingly, the mobile directional compass indicator 72 yields a comfortable visual effect for reading direction by emulating a mechanical compass display character.

The signal disturb indicator 76 indicates when the outside environment is relatively noisy due to the presence of an interference field of relatively high magnetic field intensity, preferably by flashing. When the signal disturb indicator 76 is flashing, the user knows that the existing environment does not provide enough information to produce a sufficiently reliable reading and identification of directional heading.

The calibration indicator 78 indicates that compass 40 is showing unreliable readings and performing its calibration technique in accordance with the principles of the present invention.

Referring back to FIGS. 3–7, display portion 44 also preferably includes three switches that can be actuated by the user of compass 40. In the illustrated embodiment, a power (ON/OFF) switch 79 and a backlight power (LIGHT) switch 80 are positioned on the front face of display portion 44. In their preferred form, switches 79, 80 are push-button type switches.

Power switch 79 is actuated by momentarily pressing its associated push button. Each actuation of power switch 79 causes the electronic circuitry housed within the circuit housing section 60 of display portion 44 to toggle between its operational and standby modes. The basic function of power switch 79 is to conserve energy cell consumption when compass 40 is not in use.

Backlight power switch 80 is also actuated by momentarily pressing its associated push button. Actuation of backlight power switch 80 causes a backlight associated with liquid crystal display 62 to be illuminated for a programmably adjustable period of time. The backlight associated with liquid crystal display 62 permits for easier viewing of the display, which is particularly advantageous during nighttime and other relatively dark conditions.

Figure 9:
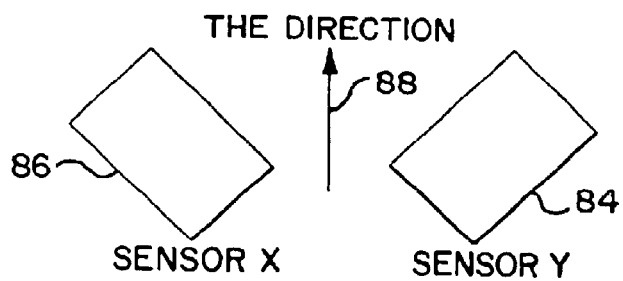
FIG. 9 is a diagrammatic view representing the preferred orientation of the magnetic field sensors incorporated in the electronic compass shown in FIGS. 3–7.

The third switch for compass 40 is illustrated in FIG. 6 and is a reset switch 82 positioned on the rear face of display portion 44. In its preferred form, reset switch 82 is a push-button type switch. Reset switch 82 is also actuated by momentarily pressing its associated push button. Actuation of reset switch 82 causes neutralization of the effect of strong magnetic influences in the environment, such as from power plants, microwave towers and the like, to ensure accurate navigation. FIG. 9 illustrates the preferred orientation for the two orthogonally disposed magnetic sensors 84, 86 forming the two data channels, respectively, for electronic compass 40. As shown, the sensors 84, 86 preferably are positioned so that their respective axes extend at a forty-five degree angle on opposing sides of the direction of vehicle travel, which is identified in FIG. 9 as an arrow 88. This orientation of sensors 84, 86 provides for the greatest accuracy of compass 40 and reduces the effect of z-plane travel (upward or downward travel), such as while driving up and/or down a hill. Magnetic field sensors 84, 86 are preferably, though not necessarily, of the type manufactured by Philips Semiconductors as product no. KMZ51, details of which can be found in its "Data Sheet" published on Mar. 24, 1998, the disclosure of which is hereby incorporated herein by reference. Those skilled in the art will appreciate that other magnetic field sensors could be used.

Figure 10:
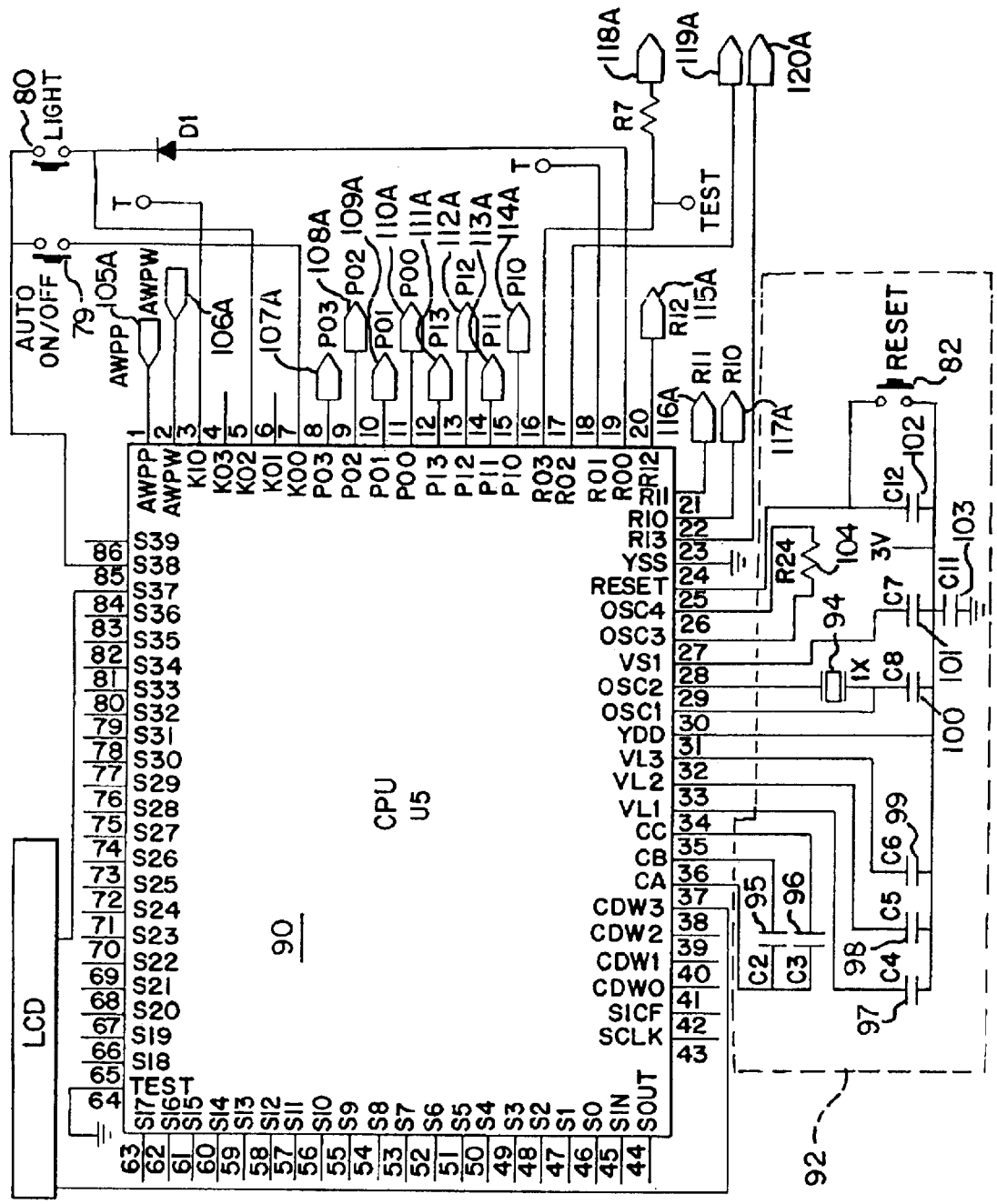
FIG. 10 is a schematic diagram showing electronic circuitry preferably incorporated within the electronic compass shown in FIGS. 3–7.
Figure 11:
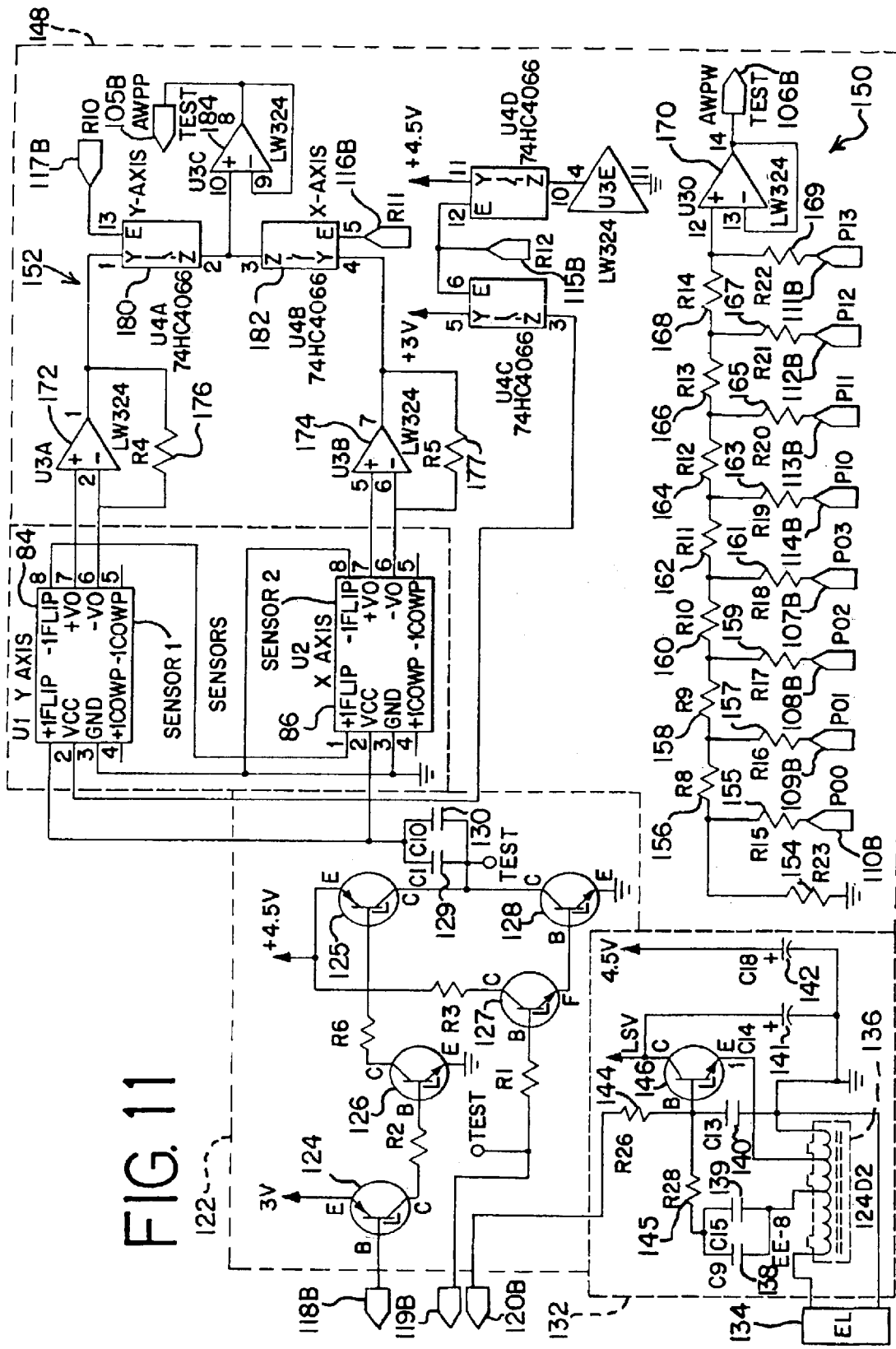
FIG. 11 is another schematic diagram showing other electronic circuitry preferably incorporated within the electronic compass shown in FIGS. 3–7.

FIGS. 10 and 11 illustrate the preferred circuitry preferably mounted on a circuit board in the circuit housing section 60 of compass 40. The primary circuitry and its general functionality are described below. It will be appreciated by those skilled in the art, however, that alternate embodiments of the circuitry could be used to carry out the principles of the present invention.

Referring to FIG. 10, a central processing unit (CPU) 90 is shown which performs the basic control and calculation functions for compass 40. CPU 90 preferably has on-chip memory associated therewith that includes software stored therein for carrying out the functions performed by electronic compass 40. Among other things, electronic compass 40 performs an initialization routine when actuated and utilizes the previously stored calibration settings for allowing immediate and reliable compass readings.

Several subcircuits are coupled to CPU 90 through its pins. For instance, as shown, LCD 62 is electrically coupled to CPU 90. Additionally, an oscillation and reset circuit 92 is preferably coupled to several of the pins of CPU 90. Oscillation and reset circuit 92 includes a crystal oscillator 94, along with a plurality of capacitors 95–103 and a resistor 104. Reset switch 82 is positioned across capacitor 103 to couple the "RESET" pin of CPU 90 to Vcc upon its actuation. Oscillation and reset circuit functions to provide timing and setup protocol for CPU 90 during initialization and reset routines.

As shown in FIG. 10, power switch 79 and backlight switch 80 are also preferably coupled to CPU 92 to perform their aforementioned functions described with reference to FIGS. 3–7. Still referring to FIG. 10, for illustrative purposes, several connection terminals 105A–120A are shown. It will be understood that those connection terminals 105A–120A are electrically coupled to their corresponding connection terminals 105B–120B shown in FIG. 11.

Referring to FIG. 11, the two data channels for electronic compass are shown in the form of magnetic field sensors 84, 86. As previously described, magnetic field sensors 84, 86 are positioned in an orthogonal relationship with respect to each other. Magnetic field sensors 84, 86 measure the magnetic field intensity along their respective axes.

A sensor power circuit 122 is further shown in FIG. 11 and includes a pair of pull-up PNP transistors 124, 125 and three pull-down NPN transistors 126–128. The sensor power circuit 122 is electrically coupled to magnetic field sensors 84, 86 through a pair of parallel connected capacitors 129–130. In operation, sensor power circuit 122 provides power and switching control for magnetic field sensors 84, 86. As will be appreciated by those skilled in the art, when the conductor associated with connection terminal 118B is HIGH, PNP transistors 124, 125 and NPN transistor 126 are actuated. In response, those transistors drive the node on the sensor power circuit side of capacitors 129–130 HIGH, as desired. Conversely, when the conductor associated with connection terminal 119B is HIGH, NPN transistors 127, 128 are actuated to pull that node LOW, as desired.

Still referring to FIG. 11, a backlight driving circuit 132 is shown and includes a backlight 134 and a multi-tap inductor 136. The conductor associated with connection terminal 120B provides control for the backlight driving circuit 132. As shown, backlight 134 is electrically coupled across the terminals of inductor 136. A pair of capacitors 138, 139 coupled in parallel are coupled to one of the taps for inductor 136. Capacitors 140–142 are coupled to one terminal of inductor 136. Resistors 144, 145 are also included. Control of backlight driving circuit 132 is provided by an NPN transistor 146, which is connected to a reference voltage at its collector electrode and one of the taps of inductor 136 at its emitter electrode. The backlight driving circuit 132 provides energy for driving backlight 134 of compass 40, as desired during low light conditions.

FIG. 11 also illustrates an analog-to-digital conversion circuit (ADC) 148, which includes an eight-bit conversion circuit 150 and an output circuit 152 for the data channel circuitry. Eight-bit conversion circuit 150 includes a resistor ladder network formed by a plurality of resistors 154–169, and a unity gain operational amplifier 170. As shown, the connection terminals 107B–114B are electrically coupled to the resistors included with the resistor ladder network and to select pins of CPU 90 through connection terminals 107A–114A.

With regard to output circuit 152, for each of the channels or magnetic field sensors 84, 86 included in the circuitry of compass 40, an output buffer amplifier 172, 174 is included. Each output amplifier 172, 174 is electrically coupled to the output terminals of its associated magnetic field sensor 84, 86. For each amplifier 172, 174, a feedback resistor 176, 177, respectively, electrically couples its output terminal with its inverting input terminal.

For the first data channel circuit, the output terminal of amplifier 172 is electrically coupled to a three-terminal data channel control circuit element 180 at one of its input terminals. The other input terminal of data channel control circuit element 180 is electrically coupled to a select pin of CPU 90 to permit the CPU to control the operation of the first data channel circuit. For the second data channel circuit, the output terminal of amplifier 174 is electrically coupled to a three-terminal data channel control circuit element 182 at one of its input terminals in similar fashion. Furthermore, the other input terminal of data channel control circuit element 182 is electrically coupled to a select pin of CPU 90 to permit the CPU to control the operation of the second data channel circuit.

The output terminals of data channel control circuit elements 180, 182 are electrically coupled to the noninverting input terminal of an operational amplifier 184. The output terminal of operational amplifier 184 is electrically coupled to its inverting input terminal, and electrically coupled to a select pin of CPU 90. The output terminal of operational amplifier 184 carries the output signal of the first and second data channel circuits, which signal is utilized by CPU 90 to identify vehicle directional heading and perform the calibration technique of the present invention.

Figure 12:
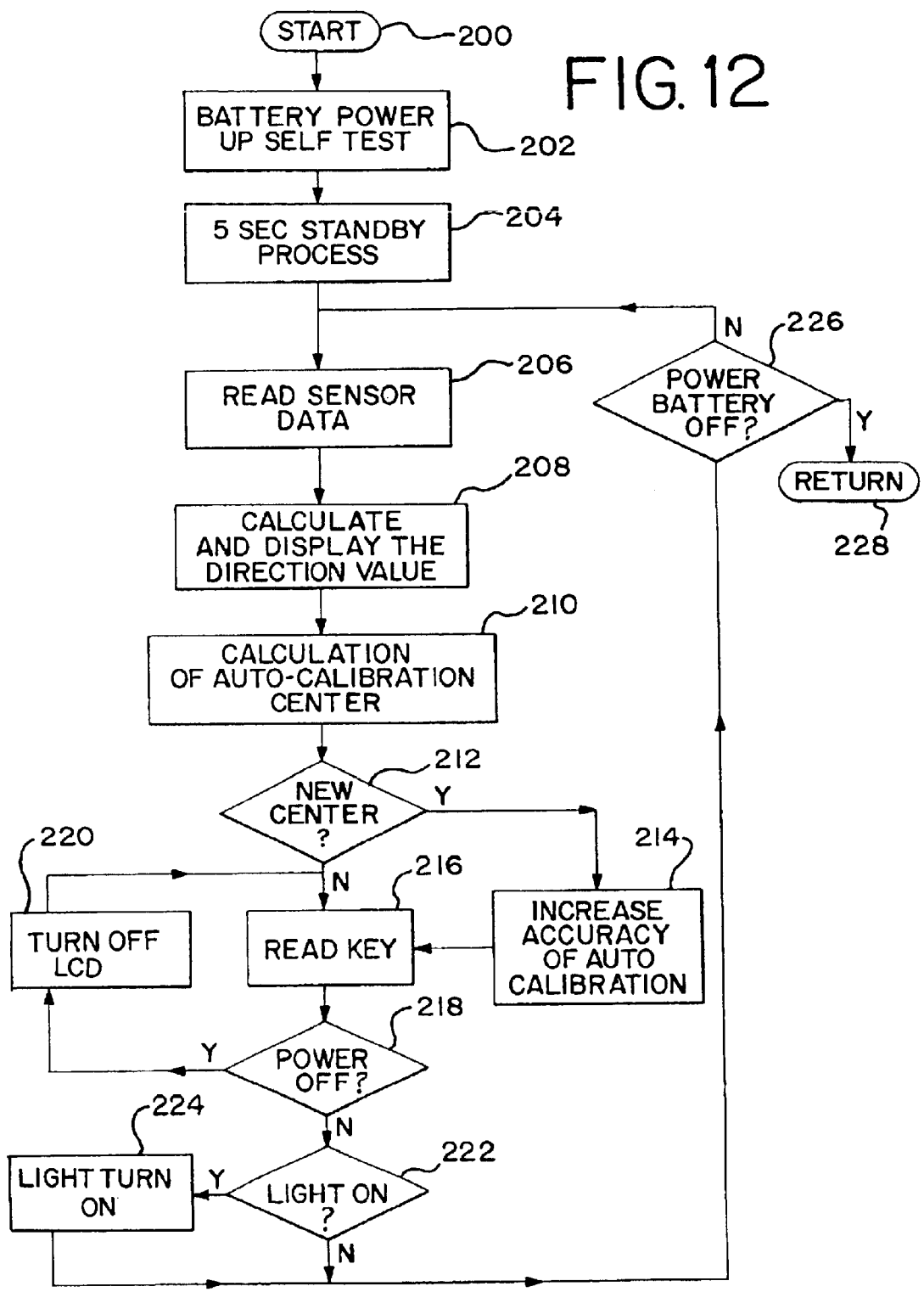
FIG. 12 is a flow chart diagram depicting the preferred operations performed by the electronic compass shown in FIGS. 3–7.

FIG. 12 illustrates a flow chart diagram depicting the preferred operations performed by electronic compass 40. The beginning of the operational process is identified by block 200. The first step performed by compass 40 is an initialization routine that includes a battery power up and circuit self test, as represented by block 202. Included within the initialization routine is a delay for a predetermined period of time, preferably five seconds, in which the circuitry associated with compass 40 is initialized, as represented by block 204. During this initialization routine, among other things, the previously stored calibration settings are utilized to provide for immediate and reliable compass readings.

Figure 2:
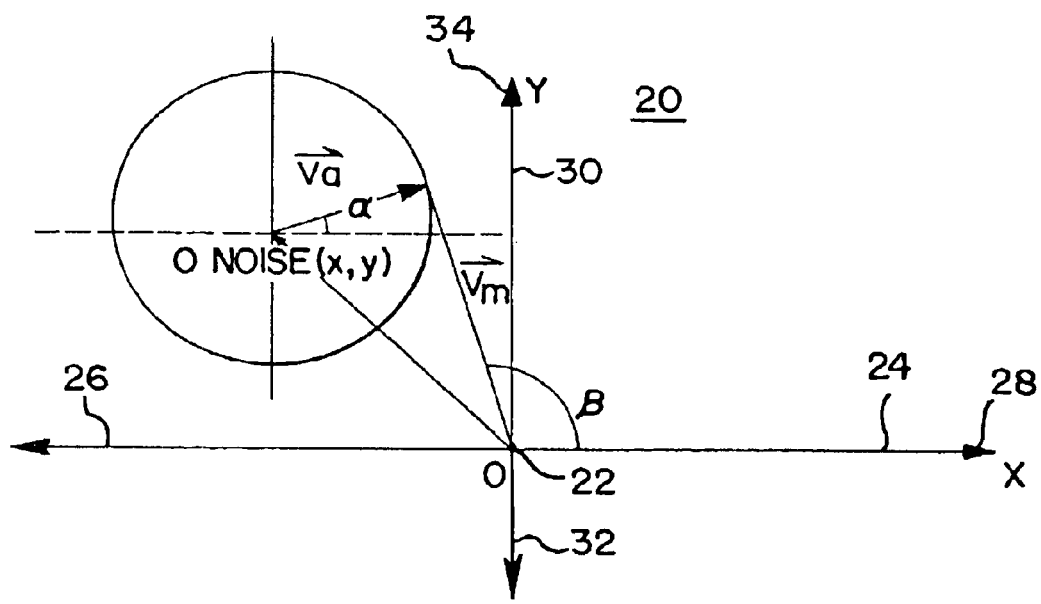
FIG. 2 is a diagrammatic view of a vector shown on a Cartesian coordinate system and corresponding to the output of an electronic compass subjected to magnetic interference in addition to the Earth's magnetic field.
Figure 7:
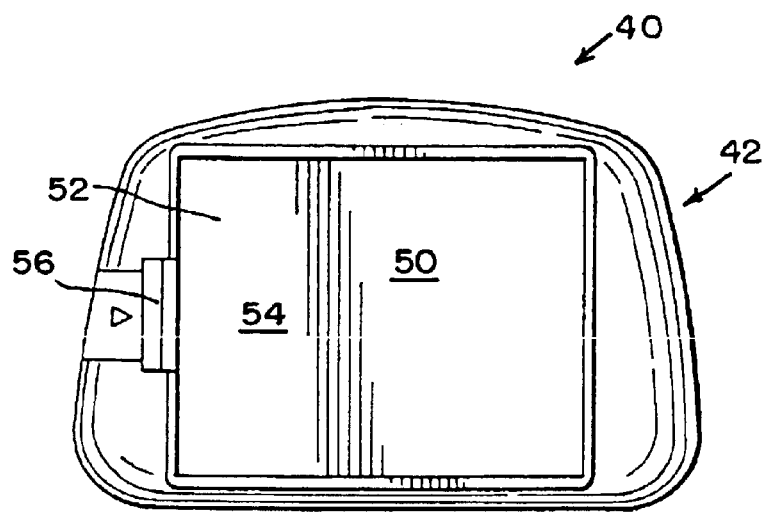
FIG. 7 is a bottom view of the electronic compass shown in FIGS. 3–6.

As represented by block 206, compass 40 next reads the data generated by its two data channels, namely magnetic field sensors 84, 86. After reading that data, compass 40 then calculates and displays the direction associated with that data, as represented by block 208. Compass 40 also calculates the noise center O_Noise (x,y) (see FIG. 2) in accordance with the true auto calibration routine of the present invention, as represented by block 210. At block 212, it is determined whether a new noise center O_Noise (x,y) (see FIG. 2) is needed to produce reliable identification of vehicle heading. If so, the noise center O_Noise (x,y) calculated at block 210 replaces the previous noise center O_Noise (x1,y1) and the true auto calibration technique yields more reliable results of compass reading, as represented by block 214.

The keys are then read, as represented by block 216. A series of decisions are then made, as represented by blocks 218, 222, 226. At block 218, it is determined whether the power switch 79 has been actuated to place the circuitry of compass 40 in its standby mode. If so, LCD 62 is turned off at block 220 and operation resumes back at the read key function represented by block 216. If not, at block 222, it is determined whether backlight power switch 80 has been actuated to illuminate the backlight 134 for compass 40. If so, backlight 134 is illuminated, as represented by block 224. If not, at 226, it is determined whether the energy cells stored in energy cell compartment 52 have been disconnected from the circuitry of compass 40. If so, at block 228, operation is returned to block 200 and the compass awaits commencement of its next initialization routine. If not, operation resumes at block 206 and further sensor data is read.

Figure 13:
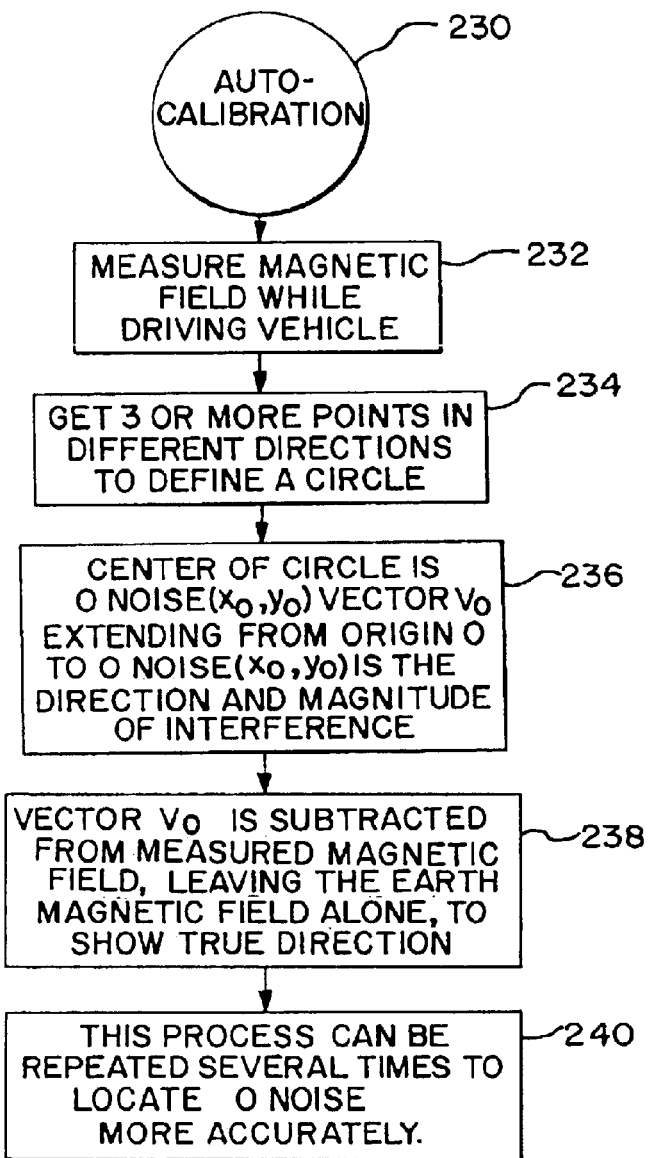
FIG. 13 is a flow chart diagram depicting the preferred steps performed during the true auto calibration routine depicted in FIG. 12.
Figure 14:
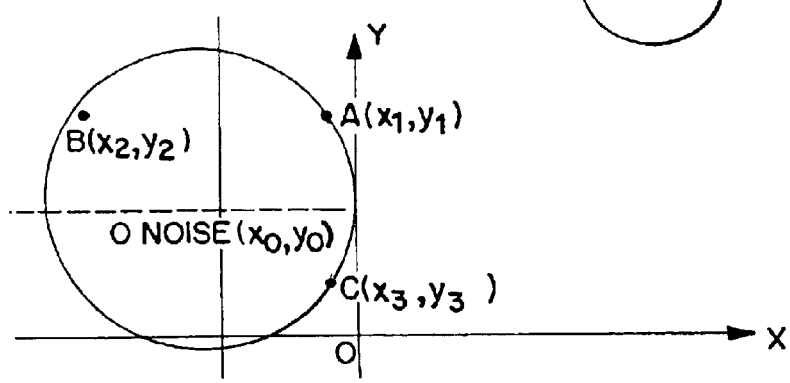
FIG. 14 is a diagrammatic view of a vector shown on a Cartesian coordinate system and representative of steps performed during the true auto calibration routine, as depicted in FIG. 13.

FIGS. 13 and 14 illustrate representations of the preferred steps performed during the true auto calibration routine in accordance with the present invention. That routine is performed in blocks 210, 212, 214 of FIG. 12. As shown, FIG. 14 is a diagrammatic view of a reference Cartesian coordinate system of the type shown and described in reference to FIGS. 2 and 3.

Initialization of the true auto calibration technique is represented by block 230. At block 232, the magnetic field is measured while the vehicle travels from place to place. This step is identical to the step depicted by block 206 in FIG. 12. For each such measurement, the first data channel of compass 40 produces an electrical signal represented by a vector component Vx on the reference Cartesian coordinate system shown in FIG. 14. Likewise, the second data channel of compass 40 produces an electrical signal represented by a vector component Vy on the reference Cartesian coordinate system shown in FIG. 14. A resultant vector Vm having orthogonal component vectors Vx and Vy represents the output of the data channel circuitry for compass 40 and is indicative of directional heading, as described above with reference to FIGS. 1 and 2.

The endpoint of each resultant vector Vm is represented by a point on the reference Cartesian coordinate system shown in FIG. 14. During the true auto calibration technique, at block 234 of FIG. 13, at least three points representing magnetic field measurements in three different directions are recorded. In FIG. 14, those three points are represented by A(x1,y1), B(x2,y2) and C(x3,y3). Taking those three points into consideration, at block 236, the noise center O_Noise(x0,y0) can be calculated by solving the following set of two equations for the coordinate (x0,y0) of the noise center. The following set of equations assumes that the square distances from each point to the noise center are equal:

$$(x1-x0)^2+(y1-y0)^2=(x2-x0)^2+(y2-y0)^2$$

$$(x2-x0)^2+(y2-y0)^2=(x3-x0)^2+(y3-y0)^2$$

The offset vector Vo represented by the vector extending from the origin of the reference Cartesian coordinate system to the noise center defines the direction and magnitude of the interference field. At block 238, this offset vector Vo is subtracted from the resultant vector Vm obtained for subsequently measured magnetic fields to produce a vector indicative of the true magnitude and true direction of the Earth's magnetic field. At block 240, this true calibration technique can be repeated by an iterative process, as desired, to more accurately determine the noise center and produce more reliable compass readings. Block 242 represents the end of the true auto calibration technique.

It will be appreciated by those skilled in the art that the true auto calibration of the present invention can be performed at any time while the vehicle moves from place to place. Furthermore, it does not require that the vehicle move in a deliberate path of any substantial significance, but only requires that the magnetic field be measured for any three different directions.

While this invention has been described with reference to illustrative aspects thereof, it will be understood that this description shall not be construed in a limiting sense. Rather, various changes and modifications can be made to the illustrative aspects of this invention without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. A method for calibrating an electric compass, comprising the steps of:

measuring a magnetic field while said magnetic field is positioned relative to said compass in a first direction;

identifying a first point that is capable of being represented as $A(x_1,y_1)$ and is indicative of said first direction of said magnetic field;

measuring said magnetic field while said magnetic field is positioned relative to said compass in a second direction;

identifying a second point that is capable of being represented as $B(x_2,y_2)$ and is indicative of said second direction of said magnetic field;

measuring said magnetic field while it is positioned relative to said compass in a third direction;

identifying a third point that is capable of being represented as $C(x_3,y_3)$ and is indicative of said third direction of said magnetic field;

utilizing only said first, second and third points to determine an offset point that can be represented as O Noise $(x_0,y_0)$ and is substantially equidistant from said first, second and third points, the calculation of said offset point being carried out by a set of equations that assumes a first square distance from said first point to said offset point is equal to a second square distance from said second point to said offset point, and said first and second square distances are equal to a third square distance from said third point to said offset point, namely:

$$(x_1-x_0)^2+(y_1-y_0)^2=(x_2-x_0)^2+(y_2-y_0)^2$$
$$(x_2-x_0)^2+(y_2-y_0)^2=(x_3-x_0)^2+(y_3-y_0)^2; \text{ and}$$

utilizing said offset point to calibrate said compass.

2. The method as defined by claim 1 wherein said magnetic field equals a sum of unknown first and second magnetic field components and said offset point permits determination of said first magnetic field component, and said compass is calibrated by subtracting said first magnetic field component from subsequent measurements of said magnetic field to derive said second magnetic field component of said subsequent measurements of said magnetic field.

3. The method as defined by claim 2 wherein said first magnetic field component is an interfering magnetic field and said second magnetic field component is Earth's magnetic field.

4. The method as defined by claim 3 wherein said interfering magnetic field substantially results from a magnetic signature of a vehicle associated with said compass.

5. The method as defined by claim 1 wherein said first, second and third points are two dimensional and can be represented on a reference Cartesian coordinate system.

6. The method as defined by claim 5 wherein said first, second and third points are included within a set of points defining a circular locus of points on said reference Cartesian coordinate system.

7. The method as defined by claim 6 wherein said first, second and third points lie within an arc of said circular locus of points and said arc includes a set of points defining substantially less than a semi-circular locus of points.

8. An electronic compass, comprising:
a first data channel circuit that measures a fist magnetic field intensity associated with a first directional component of a local magnetic field and generates a first electrical output signal indicative of said first magnetic field intensity;
a second data channel circuit that measures a second magnetic field intensity associated with a second directional component of said local magnetic field and generates a second electrical output signal indicative of said second magnetic field intensity;
a combiner circuit, electrically coupled to said first and second data channel circuits and responsive to said first and second electrical output signals, that combines said first and second electrical output signals and generates a third electrical output signal indicative of a direction of said local magnetic field and further indicative of a third magnetic field intensity associated with said direction of said local magnetic field;
a processor circuit electrically coupled to said combiner circuit that derives information indicative of said direction from said third electrical output signal, calculates a vehicle heading direction from said derived information and generates a display control signal that corresponds to said vehicle heading direction;
a display electrically coupled to said processor circuit that receives said display control signal and identifies said vehicle heading direction in a visible fashion; and
said processor circuit being programmed to allow for calibration of said compass, said calibration requiring utilization of only three measurements of said third electrical output signal by said processor, provided said three measurements of said third electrical output signal having differing directional values, and said calibration carried out by calculating coordinates for a noise center that can be represented as O_Noise ($x_\emptyset$, $y_\emptyset$) and is positioned on a reference Cartesian coordinate system at a centerpoint of a circle also positioned on said reference Cartesian coordinate system and including a first point corresponding to a first of said three measurements that is capable of being represented as $A(x_1,y_1)$, a second point corresponding to a second of said three measurements that is capable of being represented as $B(x_2,y_2)$, and a third point corresponding to a third of said three measurements that is capable of being represented as $C(x_3,y_3)$, the calculation of said noise center being carried out by a set of equations that assumes a first square distance from said first point to said noise center is equal to a second square distance from said second point to said noise center, and said first and second square distances are equal to a third square distance from said third point to said noise center, namely:

$$(x_1-x_\emptyset)^2+(y_1-y_\emptyset)^2=(x_2-x_\emptyset)^2+(y_2-y_\emptyset)^2$$
$$(x_2-x_\emptyset)^2+(y_2-y_\emptyset)^2=(x_3-x_\emptyset)^2+(y_3-y_\emptyset)^2.$$

9. The electronic compass as defined by claim 8 wherein said combiner circuit and said processor circuit are separate circuits electrically coupled together.

10. The electronic compass as defined by claim 8 wherein said first directional component of said local magnetic field measured by said first data channel circuit is orthogonal to said second directional component of said local magnetic field measured by said second data channel circuit.

11. The electronic compass as defined by claim 8 wherein said first data channel circuit includes a first magnetic field sensor, said second data channel circuit includes a second magnetic field sensor, and said first and second magnetic field sensors are orthogonally disposed with respect to each other.

12. The electronic compass as defined by claim 11 wherein said compass is adapted to be mounted in a vehicle, first magnetic sensor is disposed along a first magnetic sensor axis, said second magnetic sensor is disposed along a second magnetic sensor axis, a travel direction axis defines a vehicle travel direction, and said first and second magnetic sensor axes are aligned at forty-five degree angles on opposing sides of said travel direction axis.

13. The electronic compass as defined by claim 8 wherein said display is a liquid crystal display.

14. The electronic compass as defined by claim 13 wherein said display identifies a cardinal point indication corresponding to said vehicle heading direction.

15. The electronic compass as defined by claim 14 wherein said display identifies a directional degree indication corresponding to said vehicle heading direction.

16. The electronic compass as defined by claim 15 wherein said display includes a mobile directional compass indicator that emulates a mechanical compass indicator, said mobile directional compass indicator including an arrow indicator and a band indicator of cardinal headings.

17. The electronic compass as defined by claim 8 wherein said display includes a mobile directional compass indicator that emulates a mechanical compass indicator, said mobile directional compass indicator including an arrow indicator and a band indicator of cardinal headings.

18. The electronic compass as defined by claim 17 wherein said arrow indicator remains is displayed in a fixed position on said display and said band indicator is displayed in various formats on said display to provide an indication of various vehicle heading directions.

19. An electronic compass, comprising:
- a base portion having an upwardly extending mount and having an energy cell compartment associated therewith;
- a display portion pivotally connected to said base portion and having a circuit housing section and a liquid crystal display associated therewith;
- an electronic compass circuit contained within said circuit housing section of said display portion and electrically coupled to said energy cell compartment of said base portion, said electronic compass circuit including:
  - a first data channel circuit that measures a first magnetic field intensity associated with a first directional component of a local magnetic field and generates a first electrical output signal indicative of said first magnetic field intensity;
  - a second data channel circuit that measures a second magnetic field intensity associated with a second directional component of said local magnetic field and generates a second electrical output signal indicative of said second magnetic field intensity;
  - a combiner circuit, electrically coupled to said first and second data channel circuits and responsive to said first and second electrical output signals, that combines said first and second electrical output signals and generates a third electrical output signal indicative of a direction of said local magnetic field and further indicative of a third magnetic field intensity associated with said direction of said local magnetic field;
  - a processor circuit electrically coupled to said combiner circuit and to said liquid crystal display that derives information indicative of said direction from said third electrical output signal, calculates a vehicle heading direction from said derived information and generates a display control signal that corresponds to said vehicle heading direction for controlling the liquid crystal display to display an indication of said vehicle heading direction in a visible fashion; and
  - said processor circuit being programmed to allow for calibration of said compass, said calibration requiring utilization of only three measurements of said third electrical output signal by said processor, provided said three measurements of said third electrical output signal have differing direction values, and said calibration carried out by calculating coordinates for a noise center that can be represented as O_Noise $(x_\varnothing, y_\varnothing)$ and is positioned on a reference Cartesian coordinate system at a centerpoint of a circle also positioned on said reference Cartesian coordinate system and including a first point corresponding to a first of said three measurements that is capable of being represented as $A(x_1, y_1)$, a second point corresponding to a second of said three measurements that is capable of being represented as $B(x_2, y_2)$, and a third point corresponding to a third of said three measurements that is capable of being represented as $C(x_3, y_3)$, the calculation of said noise center being carried out by a set of equations that assumes a first square distance from said first point to said noise center is equal to a second square distance from said second point to said noise center, and said first and second square distances are equal to a third square distance from said third point to said noise center, namely:

$$(x_1-x_\varnothing)^2+(y_1-y_\varnothing)^2=(x_2-x_\varnothing)^2+(y_2-y_\varnothing)^2$$

$$(x_2-x_\varnothing)^2+(y_2-y_\varnothing)^2=(x_3-x_\varnothing)^2+(y_3-y_\varnothing)^2.$$

20. The electronic compass as defined by claim 19 wherein said circuit housing section and said liquid crystal display are secured together by a pair of end caps positioned on opposing sides of said display portion.

* * * * *